United States Patent [19]
Ellis

[11] 3,779,065
[45] Dec. 18, 1973

[54] CALIBRATOR FOR DETERMINING THE MAGNITUDE OF STRAINS IN RIGID ARTICLES
[75] Inventor: Greer Ellis, Pelham, N.Y.
[73] Assignee: Vishay Intertechnology, Inc., Malvern, Pa.
[22] Filed: May 23, 1972
[21] Appl. No.: 256,027

[52] U.S. Cl............................ 73/1 R, 73/1 B
[51] Int. Cl. .................................. G01n 3/62
[58] Field of Search ............. 73/1 B, 88 R, 100

[56] References Cited
UNITED STATES PATENTS
2,310,845  2/1943  Ellis ........................... 73/88 R
2,831,344  4/1958  Kaar et al. ..................... 73/100

Primary Examiner—S. Clement Swisher
Attorney—Roger Norman Coe

[57] ABSTRACT

A direct reading, portable calibrator is disclosed for use in accurately measuring the threshold crack sensitivity of a brittle coating for experimental stress analysis. The calibrator is operated by loading a calibration bar, coated with a brittle coating, with thumb pressure at the free end of the bar. Cracks in the coating appear and the threshold strain value, determined in microinches per inch, is read directly from a precision strain scale built into the calibrator.

10 Claims, 2 Drawing Figures

PRIOR ART

PATENTED DEC 18 1973 3,779,065

CALIBRATOR FOR DETERMINING THE MAGNITUDE OF STRAINS IN RIGID ARTICLES

FIELD OF THE INVENTION

The present invention relates to a direct reading, portable calibrator designed for experimental stress analysis and more particularly, to a direct reading, portable calibrator which is designed to accurately measure the threshold crack sensitivity of brittle coatings on at least one built-in precision strain scale which permits direct reading with respect to strain sensitivity level.

BACKGROUND OF THE INVENTION

Since the work by Greer Ellis which resulted in the issuance of patents in the early 1940's, it has been known that the strain concentration in rigid articles of relatively high elastic limit can be determined by a method which includes coating a rigid article with adherent brittle film that will crack uniformly at the same stress value regardless of slight variations in the thickness of the coating. As the coated article is subjected to increasing known loads, the coating film will crack initially over the most highly strained area of the coated rigid article and subsequently over areas of lower strain concentration as the load is increased. The strain concentration in the different areas is inversely proportional to the magnitude of the load required to form the crack pattern over said areas.

For many years the calibration device set forth in U.S. letters Pat. No. 2,310,845 has been used to determine the minimum strain level required to produce a crack in a brittle lacquer. The apparatus described in the aforementioned patent accomplishes this objective by bending a cantilevered beam through a given deflection in a manner more fully set forth below to produce a known linear strain gradient in the deflected beam. It was then necessary to remove the beam from the bending fixture and insert the beam into another fixture in order to match the gradient imposed by the bending fixture with a strain scale. By matching the first crack on the beam with the strain level indicated on the strain scale, the "threshold" strain or sensitivity of the brittle lacquer to strain magnitude was determined.

Although furnishing a standard used by the industry for many years, the calibration equipment of the prior art involves certain fundamental defects. These defects include the disadvantage of having to remove the deflected beam and insert it into other apparatus in order to attempt to measure the threshold crack sensitivity of the brittle coating, the problem of having cracks, open at the time of deflection, become closed when the beam is removed for insertion into the separate equipment required for measuring the threshold crack sensitivity of the brittle coating and the absence of any versatility in the apparatus, necessitating that different equipment be used for each strain sensitivity level.

SUMMARY OF THE INVENTION

An object of the present invention is to provide an improved calibrator for determining the magnitude of strains in rigid articles of relatively high elastic limit.

Another object of the present invention is to provide a direct reading calibrator for use in experimental stress analysis.

Still another object of the present invention is to provide a calibrator for use in accurately measuring the threshold crack sensitivity of brittle coatings which permits more than one strain sensitivity level to be read directly from precision scales built into the calibrator.

Yet another object of the present invention is to provide a portable calibrator which can be loaded by thumb pressure on the free end of the calibration bar.

A further object of the invention is to provide a calibrator for use in accurately measuring the threshold crack sensitivity of brittle coatings which can be accurately preset to a known zero point.

In accordance with the present invention, a portable, direct reading, preset calibrator is disclosed for accurately measuring the threshold crack sensitivity of brittle coatings. The calibrator permits a calibration bar to be loaded simply by thumb pressure at the free end of the bar to more than one strain sensitivity level and permits threshold strain values to be read directly from precision scales built into the calibrator.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Figure 1:
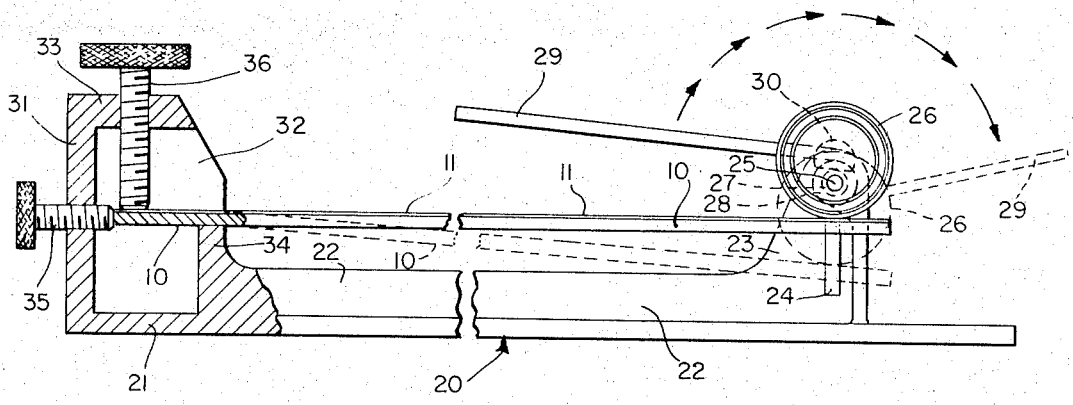
FIG. 1 shows a fragmentary side elevational view, with certain parts shown in longitudinal cross section, of a prior art device for subjecting a standardized bar (also shown) to a predetermined stress.

The apparatus illustrated in FIG. 1 is a prior art device for measuring the magnitude of strains. Referring to this figure, reference numeral 10 indicates a resilient metal bar of standardized dimensions coated with a continuous adherent film 11 whose cracking characteristics in response to stresses are not substantially affected by the local variations in film thickness. The calibrating device itself, indicated generally at 20, is used for subjecting bar 10 to a predetermined deformation.

In actual use, bar 10 and a rigid article of relatively high elastic limit (not shown) are coated at the same time and under the same moisture and temperature conditions with a brittle lacquer, comprising a brittle resin, a solvent and plasticizer, developed for experimental stress analysis. The film-forming brittle lacquer composition is allowed to dry overnight under essentially constant temperature and humidity conditions.

At the end of the drying period bar 10 is inserted in calibrating device 20 as shown. The calibrating device 20 comprises an elongated flat frame 21 provided with a longitudinal reinforcing rib 22 extending along the frame. This reinforcing rib 22 terminates, short of the end of the frame, in a bearing pedestal 23 which is supported by a short transverse extension of the reinforcing rib. A vertical guide member 24 projects inwardly over frame 21 from bearing pedestal 23.

A shaft 25 rotatably carried by the bearing pedestal projects inwardly as far as guide 24 and has a round disc 26 eccentrically mounted on its end. The shaft portion 25 journalled in bearing pedestal 23 is constricted, the whole shaft being held against axial movement by a nut 27 and a washer 28. A deflection lever 29 is affixed to the round cam disc 26 by means of a projection 30. Movement of lever 29 in the direction of the arrows lowers cam disc 26 along the edge of guide 24 to the position shown in the dotted lines.

The other end portion of frame 21 carries a box-like head comprising a transverse terminal wall 31, a longitudinal marginal wall 32, a cover member 33 and a transverse front wall 34, terminating short of cover member 33 at a height slightly lower than the top of guide 24. Set screws 35 and 36 are disposed, respectively, in rear terminal wall 31 and cover member 33.

With coated bar 10 placed in calibrator 20 as shown in full lines in FIG. 1, the cam deflection lever 29 is pulled all the way back and the bar 10 is brought against cam 26 and pushed all the way back against set screw 35 in the rear and over against vertical guide member 24. Set screw 36 must then be adjusted until the outer end of bar 10 is raised to just touch the undersurface of the cam. Cam deflection lever 29 is then pulled fully forward into a position shown in FIG. 1 by dotted lines, bar 10 being bent in the manner of a cantilever beam, as also shown by dotted lines. The cam deflection lever 29 is kept in this position and while the beam is deflected the threshold crack sensitivity level is normally marked. The bending operation can be repeated again if necessary to obtain a "full crack pattern" in the brittle film.

In order to measure the minimum strain necessary to crack the brittle film it is necessary to remove stress bar 10 from calibrating device 20, insert the bar into further apparatus containing a strain scale and then attempt to match the crack patterns on the bar with a strain scale.

The apparatus of FIG. 1 has certain serious drawbacks. These drawbacks include the inability to predetermine the zero point in the apparatus since set screw 36 must be adjusted with respect to coated bar 10. This means that one using calibrating device 20 cannot be absolutely certain as to the force exerted by set screw 36. Another drawback of the apparatus is the fact that it is impossible to make a direct reading. Bar 10 has to be removed from calibration device 20 and inserted into another device before a measurement can be made of the threshold crack sensitivity of the brittle coating 11 on bar 10. In addition to the problem of having to use separate apparatus for measuring the threshold crack sensitivity of the brittle coating there is the problem that cracks which are open during the deflection of bar 10 in calibrating device 20 tend to close once bar 10 is removed from the calibrating device and bar 10 is no longer deflected. Still a further drawback with the apparatus depicted in FIG. 1 is the fact that it permits the measurement of only one strain sensitivity level.

Figure 2:
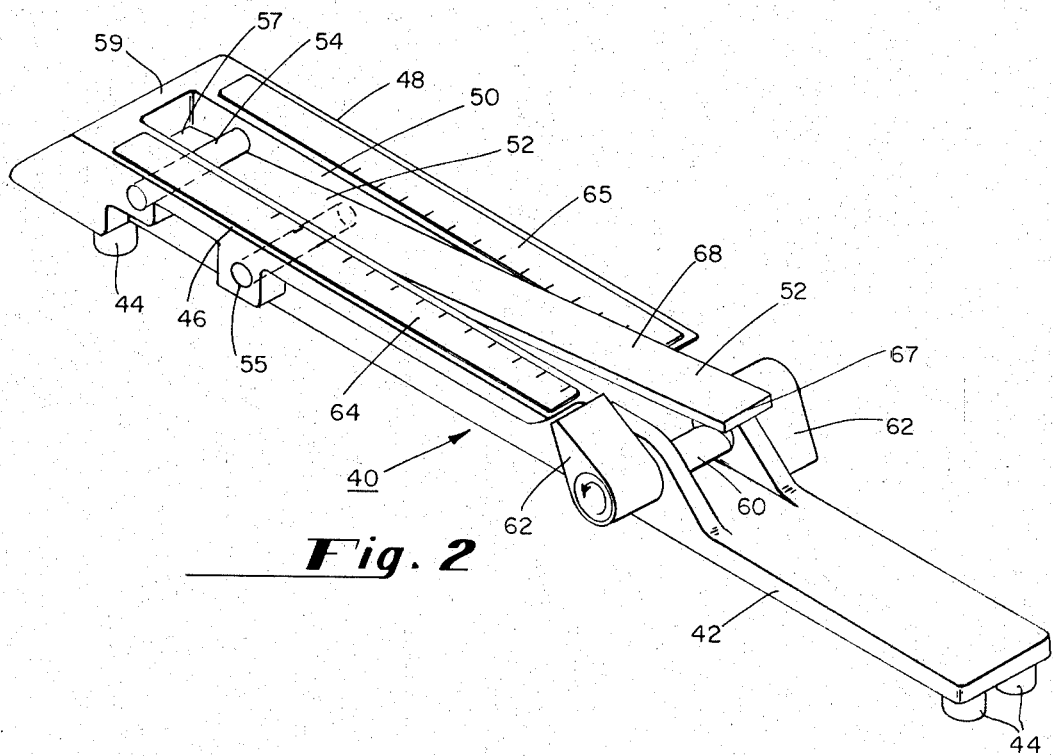
FIG. 2 shows a perspective view of a calibration device in accordance with the present invention for subjecting a calibration bar (also shown) to more than one strain sensitivity level.

Referring to FIG. 2, the novel calibrating device constructed in accordance with the present invention is generally indicated by reference numeral 40. Calibrating device 40 comprises an elongated flat frame 42 which is supported by a plurality of support feet 44, made of nonskid rubber or other suitable material. The calibrating device 40 has two sides 46 and 48 which define a channel 50 in which calibration bar 52 is placed. Shaft or pin 54 and calibrating fulcrum 55 extend between sides 46 and 48 of calibrator 40 and serve to guide, retain and act as a fulcrum for calibration bar 52. Calibration bar 52 is inserted in channel 50 in such a manner that end 57 of calibration bar 52 rests on frame 42 when positioned under shaft 54 and over calibrating fulcrum 55. End 57 of calibration bar 52 also abuts end wall 59 of calibrator 40.

Calibrator 40 contains a cam 60 which is located between side walls 46 and 48. When calibration bar 52 is deflected, it is pressed by thumb pressure against cam 60. Cam 60 is eccentric and can be rotated by turning knobs 62 in order to obtain different strain sensitivity levels. Although cam 60 could have several different positions, a specific embodiment of the invention involves two positions for cam 60 which can be changed by rotating knobs 62 180°. This specific embodiment permits two different strain sensitivity levels to be obtained using the same equipment. By mounting two different precision strain scales 64 and 65 on the tops of side walls 46 and 48, respectively, it is possible to measure the threshold crack sensitivity of the brittle coating directly using one or both of the two strain sensitivity levels provided by cam 60.

In the operation of calibrator 40 in accordance with the present invention the calibration bar, which is prepared using a suitable metal, typically, steel or aluminum, is coated at the same time as the test part with a brittle coating used for experimental stress analysis. After drying, calibration bar 52 is placed in calibrator 40 in the position shown in FIG. 2. The bar is then loaded by thumb pressure applied at end 67, the free end of calibration bar 52. With pressure applied at the free end of calibration bar 52, cracks in the brittle coating on the top surface 68 of the bar appear and the threshold strain value, determined in microinches per inch, can be read directly from one of the two precision scales 64 and 65 built into the calibrator.

Calibrating fulcrum 55 is eccentric with regard to its support holes thus allowing initial adjustment and calibration of calibrator 40 to remove any error caused by manufacturing tolerances in the relative position of the three shafts that touch the deflected calibration bar 52. It will accordingly be seen that the portable, direct reading calibrator 40 set forth in FIG. 2 can be precalibrated to a zero point prior to use. No further adjustment of this zero position is required and a set screw (not shown) can be used to hold calibrating fulcrum in position.

Calibrator 40 has further advantages in that the incorporation of precision strain scales 64 and 65 into the device prevents any errors caused by incorrect positioning of calibration bar 52 and eliminates the necessity for removing calibration bar 52 from calibrator 40 in order to match the gradient imposed by the bending fixture with a strain scale. The convenience of a direct reading built-in scale alone is advantageous even apart from the definite advantage achieved in the elimination of errors which occurred in previous calibrating procedures. Moreover, with pressure applied to end 67 of calibration bar 52 cracks appearing in coated surface 68 of calibration bar 52 can be readily seen. Such cracks tend to close upon the removal of calibration bar 52 from its deflected position.

Another important feature of calibrator 40 is that it has an extended strain range for calibration. As explained hereinabove, rotation of cam 60 by means of knobs 62 permits selection of different strain ranges. In the specific embodiment mentioned above, having two strain sensitivity levels, cam 60 can be positioned either for a high or a low strain range and knobs 62 can be so positioned to point to the proper scale to be read for each strain range. Thus, for brittle coatings which have a low threshold of strain sensitivity in the 100 to 1,500 microinches per inch range, scale 65 can be calibrated for this range, whereas for coatings having a higher threshold scale 64 can be calibrated in the range from 200 to 3,000 microinches per inch. In FIG. 2, knobs 62 indicated that scale 64 is the one to be used.

From the foregoing, it will be seen that this invention is adapted to obtain all of the ends and objects hereinabove set forth, together with other advantages which are obvious and which are inherent. Obviously, calibrator 40 can be modified in a variety of ways in order to achieve the objectives outlined herein. Cam 60, for example, which allows the calibration bar or beam 52 to be bent to either of two positions, could be replaced with suitable modifications for accomplishing the same result, such as a stepped sliding piece, removable stops or detents, the presence of an adjustable micrometer stop screw for continuously adjusting calibration, and the like. Similarly, the position of the two pins or shafts which retain the other end of calibration bar 52 could be adjusted to produce variable bending in the calibration bar. Instead of shaft 54 end 57 of the calibration bar 52 could be retained by a pin extending through end 59 of calibration device 40. It is also apparent that one knob could be employed in place of knobs 62—62 for rotating cam 60. Instead of fixed scales 64 and 65, replaceable strain scales could be provided for direct measurement of threshold crack sensitivity.

Obviously, many modifications and variations of the invention as hereinbefore set forth can be made without departing from the spirit and scope thereof and therefore only such limitations should be imposed as are indicated by the appended claims.

I claim:

1. A direct reading, portable calibrator for deflecting a calibration bar and measuring the threshold crack sensitivity of brittle coating applied to the calibration bar, said calibrator comprising an elongated frame member, two side wall members attached to the frame member and forming an elongated channel between said side wall members, three shafts located between the two side wall members and so positioned as to permit an elongated calibration bar to be retained in the channel of the calibrator while being deflected, wherein one of said shafts acts as a fulcrum for said calibration bar and another shaft functions to limit the deflection of the calibration bar to a preselected strain sensitivity level.

2. The calibrator of claim 1 wherein the shaft which limits the deflection of the calibration bar can be adjusted to provide more than one strain sensitivity level.

3. The calibrator of claim 1 which further contains at least one precision scale located on the calibrator in such a manner to permit direct reading of threshold crack sensitivity without removing the calibration bar from said calibrator.

4. The calibrator of claim 3 in which there are two precision strain scales which run parallel to the calibration bar and wherein the precision strain scales are located on the respective side wall members of the calibrator.

5. The calibrator of claim 1 which further contains precision strain scales located on the calibrator in such a manner as to permit direct reading of threshold crack sensitivity without removing the calibration bar from the calibrator at a strain sensitivity level determined by the shaft which limits the deflection of the calibration bar, such shaft being adjustable to provide more than one strain sensitivity level by means which indicate which strain sensitivity level the calibrator is adjusted to.

6. A portable calibrator apparatus for measuring the threshold crack sensitivity of brittle coating applied to a calibration bar, said calibrator comprising:
   an elongated frame member and two side wall members attached to the frame member so as to form an elongated channel with the elongated frame member;
   retaining means in said elongated channel for retaining one end of a calibration bar;
   fulcrum means in said elongated channel for deflecting a calibration bar;
   adjustable means located in the elongated channel at an end opposite the retaining means for limiting the deflection of a calibration bar over the fulcrum means; and
   means for positioning the fulcrum means in order to calibrate the apparatus.

7. The apparatus of claim 6 which includes means for permanently positioning the fulcrm means once the apparatus has been calibrated.

8. A method of determining the threshold crack sensitivity of a calibration bar coated with a brittle coating, which method comprises: inserting the coated calibration bar into a calibrator comprising an elongated frame member having two side walls forming a channel with the frame member and three shafts located in the channel and attached to the side walls, said shafts comprising a first shaft and a second shaft for retaining one end of the calibration bar and a third shaft which functions to limit deflection of the free end of the calibration bar upon pressure being applied to that end of said calibration bar, applying pressure to the free end of the calibration bar causing the bar to be deflected over the second shaft as a fulcrum point and causing the free end of the calibration bar to be pressed into contact with the third shaft which serves to limit deflection, and matching crack patterns resulting from the deflection of the calibration bar with the strain scale attached to the side wall of the calibrator.

9. The method of claim 8 wherein the third shaft is adjusted prior to determining the threshold crack sensitivity of a coated calibration bar in order to establish a particular strain sensitivity level for the calibrator.

10. The method of claim 8 wherein the pressure applied to the free end of the calibration bar is hand pressure.

* * * * *